US009817395B2

(12) United States Patent
Sisbot et al.

(10) Patent No.: US 9,817,395 B2
(45) Date of Patent: Nov. 14, 2017

(54) AUTONOMOUS NAVIGATION OF PEOPLE USING A ROBOT NETWORK

(71) Applicant: TOYOTA JIDOSHA KABUSHIKI KAISHA, Toyota-shi, Aichi-ken (JP)

(72) Inventors: Emrah Akin Sisbot, Mountain View, CA (US); Halit Bener Suay, Mountain View, CA (US)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/087,855

(22) Filed: Mar. 31, 2016

(65) Prior Publication Data

US 2017/0285635 A1    Oct. 5, 2017

(51) Int. Cl.
*G05D 1/00* (2006.01)
*G06Q 10/06* (2012.01)

(52) U.S. Cl.
CPC ..... *G05D 1/0027* (2013.01); *G06Q 10/06311* (2013.01)

(58) Field of Classification Search
USPC .......................................................... 701/2
See application file for complete search history.

(56) References Cited

U.S. PATENT DOCUMENTS

| 2006/0041333 | A1* | 2/2006 | Anezaki | G06K 9/00201 |
| | | | | 700/259 |
| 2007/0266117 | A1* | 11/2007 | Pomies | H04L 29/06 |
| | | | | 709/218 |
| 2016/0171303 | A1* | 6/2016 | Moore | G06K 9/00671 |
| | | | | 382/153 |
| 2016/0267755 | A1* | 9/2016 | Martinson | G08B 6/00 |

OTHER PUBLICATIONS

Ulrich et al., "The GuideCane—Applying Mobile Robot Technologies to Assist the Visually Impaired," IEEE Transactions on Systems, Man, and Cybernetics, Mar. 2, 2001 (12 pages).
Kulyukin et al., "A Robotic Waytinding System for the Visually Impaired," Department of Computer Science, Utah State University, 2004 (6 pages).
Pandey et al., "Towards a Sociable Robot Guide which Respects and Supports the Human Activity," 5th Annual IEEE Conference on Automation Science and Engineering, Aug. 22, 2009 (6 pages).
Melvin et al., "ROVI: A Robot for Visually Impaired for Collision-Free Navigation," Proceedings of the International Conference on Man-Machine Systems, Oct. 11, 2009 (6 pages).

* cited by examiner

*Primary Examiner* — Tyler Paige
(74) *Attorney, Agent, or Firm* — Patent Law Works LLP

(57) ABSTRACT

This disclosure describes, according to some embodiments, a robot network comprising a plurality of robot units capable of providing navigational guidance to patrons requesting navigational assistance. In an example method, upon receiving a request from a first patron, the method selects an available robot unit from among a plurality of robot units comprising the robot network based on an estimated time to reach the first patron's location. The estimated time to reach the first patron's location is determined based on status updates of other of the robot units comprising the robot network. The method further assigns the available robot unit to the first patron, navigates the assigned robot unit to the first patron's location, engages the first patron using the assigned robot unit, and guides the first patron toward the requested destination using the assigned robot unit.

20 Claims, 16 Drawing Sheets

AUTONOMOUS NAVIGATION OF PEOPLE USING A ROBOT NETWORK

BACKGROUND

The specification relates to a robotic navigation system. In particular, in some non-limiting embodiments, the specification relates to technology for the autonomous navigation of people using a robot network.

It is a challenge to navigate mobile automated systems (e.g., robots) in a dynamic environment that includes dynamic obstacles such as human crowds, a combination of static obstacles and moving obstacles, etc. Generally, only a very limited amount of information regarding the dynamic environment is available since the environment keeps changing continuously. For example, the number of moving objects (e.g., crowds of walking people) in the environment changes all the time and the paths and the destinations of the moving objects are unknown. This dynamic change in the environment presents a challenge to determine a safe and collision free path for navigating the mobile automated system to a destination while respecting social behavior norms.

Additionally, existing solutions generally dedicate a specific robot to each person requiring assistance, which is inefficient and adds additional obstacles to the environment. These systems are incapable of allocating a single robot to multiple people. Additionally, if a user does not follow the robot assigned to it, the system waits for a certain amount of time and quits if timeout is reached. The system assumes that the user will see the robot and resume following, which is inapplicable for certain types of users, such as a blind user.

Further, most blind-aid robotics solutions require the blind person to hold on to a dedicated robot specifically configured to guide him/her, while the robot pulls/pushes the user to guide him/her to his/her destination. Since the robot is configured to assist a specific individual, it limits the ability for it to provide service to multiple individuals, particularly in a dynamic environment.

In some cases where fewer robots than individuals exist in the crowd, some individuals may go unassisted or may be made to wait for unreasonable durations. As such, these solutions fail to provide an effective approach for navigating a mobile automated system in such a dynamic environment having heavy crowds.

SUMMARY

The specification overcomes the deficiencies and limitations of the solutions described in the background art at least in part by providing novel technology that autonomously navigation people using a robot network.

According to one innovative aspect of the subject matter described in this disclosure, a system includes one or more computer processors and one or more memories storing instructions that, when executed by the one or more processors, cause the system to perform operations including: receiving an escort request to escort a first patron to a requested destination, determining a first patron's location, selecting an available robot unit from among a plurality of robot units comprising the robot network based on an estimated time to reach the first patron's location, the estimated time to reach the first patron's location being determined based on status updates of other of the robot units comprising the robot network, assigning the available robot unit to the first patron, navigating the assigned robot unit to the first patron's location, engaging the first patron using the assigned robot unit, and guiding the first patron toward the requested destination using the assigned robot unit.

In general, another innovative aspect of the subject matter described in this disclosure may be embodied in methods for managing a robot network that include receiving, using one or more computer processors, an escort request to escort a first patron to a requested destination; determining, using the one or more computer processors, a first patron's location; selecting, using the one or more computer processors, an available robot unit from among a plurality of robot units comprising the robot network based on an estimated time to reach the first patron's location, the estimated time to reach the first patron's location being determined based on status updates of other of the robot units comprising the robot network; assigning, using the one or more computer processors, the available robot unit to the first patron; navigating, using the one or more computer processors, the assigned robot unit to the first patron's location; engaging, using the one or more computer processors, the first patron using the assigned robot unit; and guiding, using the one or more computer processors, the first patron toward the requested destination using the assigned robot unit.

Other aspects include corresponding methods, systems, apparatus, and computer program products for these and other innovative aspects.

These and other embodiments may each optionally include one or more of the following features and/or operations. For instance, the features and/or operations include: that the robot units comprising the robot network are configured to cooperatively provide navigation guidance within a service area; that the plurality of robot units including the assigned robot unit; that the service area is divided into two or more zones; that each of the two or more zones represent a portion of the service area, and the available robot is assigned to one of the two or more zones; iteratively receiving at a server via a computer network status updates from the robot units; generating one or more navigational paths for one or more of the robot units based on the status updates; controlling the movement of the one or more robot units based on the one or more navigational paths; that the plurality of robot units are wirelessly coupled via a computer network; updating a grid map with a current status of the assigned robot unit once the robot unit has guided the first patron to the requested destination; assigning the robot unit to guide a subsequent patron to a subsequent requested destination based on the grid map, which includes the current statuses of other robot units in the robot network; transferring the first patron, at a particular location between a start location and the requested destination, to a second robot unit; guiding the first patron to the requested destination using the second robot unit; prior to transferring the first patron, assigning the second robot unit to navigate a second patron to second destination; that the second destination is the same as the requested designation; and guiding the second robot unit to the particular location to pick-up the first patron, wherein guiding the first patron to the requested destination using the second robot unit includes guiding the first patron and the second patron to the requested destination together; determining a list of robot units comprising at least a portion of the robot network; filtering the list of robot units based on patron capacity of each of the robot units; refining the filtered list of robots based on an estimated time for each of the robot units to reach the patron's location; that the refined list includes the available robot; assigning the available robot from the refined list of robot units; determining a priority of the patron relative to other patrons requesting guidance; ranking the refined list of robots based on the priority of the patron; and that the ranking includes the available robot.

The technology is particularly advantageous because it can scale from small to large crowds, can accommodate a single user and multiple users with one or more robot units, can adapt to changing characteristics of an environment, can cooperatively navigate multiple robots along multiple paths to service the needs of a multicity of users, etc.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

This document discloses technology for autonomously navigating people within an environment using a robot network. In an example embodiment, the technology utilizes a grid map. The robots forming the network populate the grid map with their most up-to-date information, and communicate with the guidance system (e.g., path coordinator and task allocator) wirelessly. With this information, the guidance system finds a robot or set of robots to guide the user in a manner that minimizes the user's wait, and the guidance duration.

The following is an example illustrating what a user who is blind may experience via the technology, although it should be understood that the technology is applicable to a number of applications, such as guiding any type of user through an environment, guiding other autonomous robotic units, such as vehicles, in a driving environment, etc.

In an example scenario, a blind user arrives to or dynamically forming a station where it calls a robot guide for assistance. The blind user transmits his/her destination via the call. This call can be done through a mobile device such as a phone or through a dedicated terminal. Responsive to the call, the robot unit arrives to pick up the user at the transmitted location. There might be other users following the robot unit at that time. The technology's guidance system, which is described in further detail below, considers the presence of robot unit's users and their destinations. During the guidance, the robot unit can transfer the user to another robot unit. This transfer happens smoothly without causing discomfort to the other users, if any. Once the robot reaches to blind the user's destination, the guidance stops for that user (but may continue for the other users if any).

Figure 1:
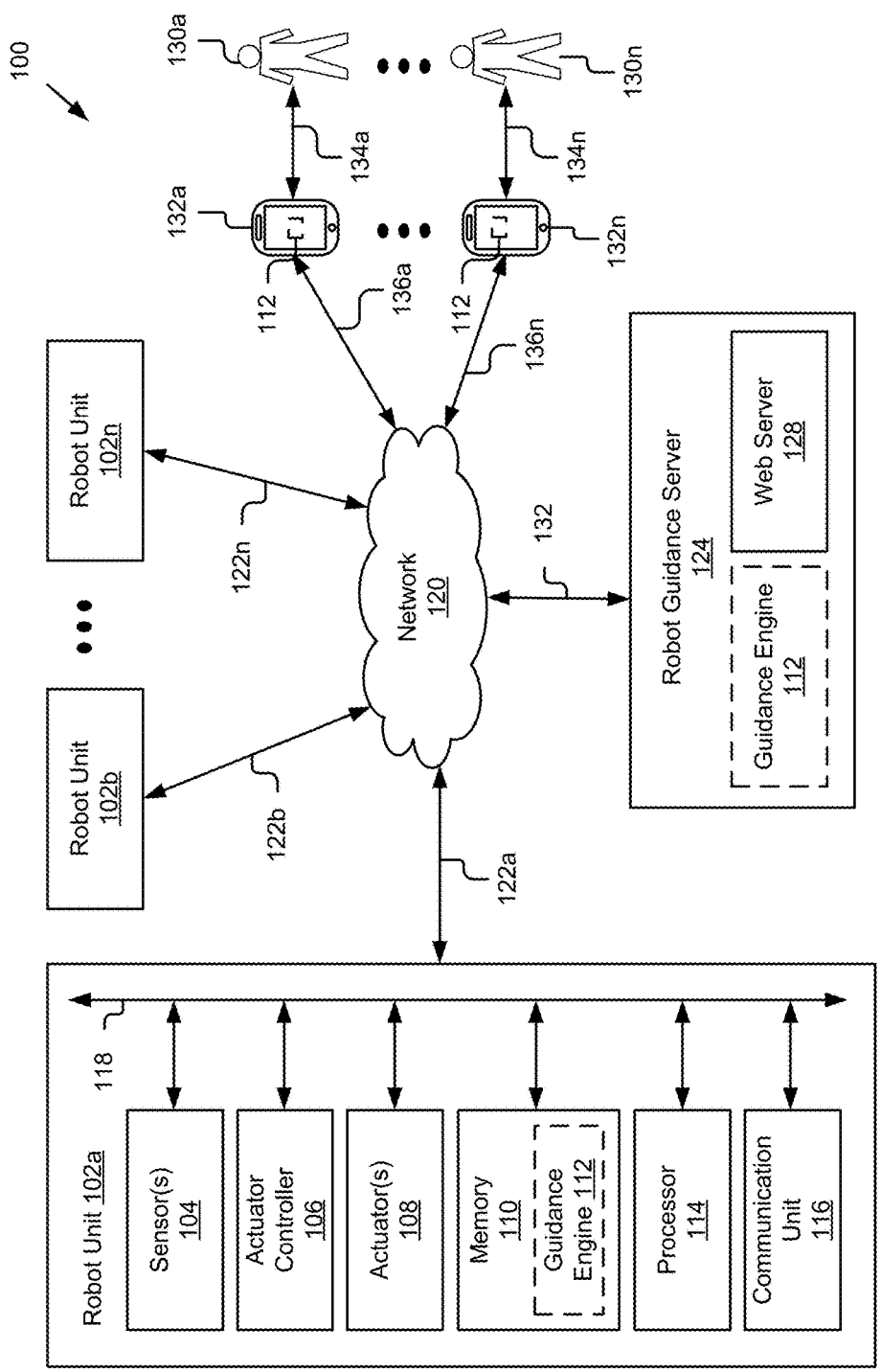
FIG. 1 is a high-level block diagram illustrating an example guidance system.

The guidance system is capable of guiding multiple robots units. Each robot unit is capable of autonomously moving from one point to another while considering the presence of obstacles, objects, and people. An example guidance system 100 is depicted in FIG. 1. As shown, the system 100 may include any number of robot units 102, as reflected by robot units 102a, 102b, . . . 102n. The robot unit(s) 102 are wireless communicatively coupled to a network 120 as reflected by signal lines 122a, 122b, . . . 122n. The system 100 may further include one or more client devices 132, as reflected by client devices 132a . . . 132n, which are communicatively coupled to the network 120 via signal lines 136a . . . 136n. Users 130a . . . 130n can interact with the client devices via input and output devices, as reflected by lines 134a . . . 134n. The system 100 may further include a robot guidance server 124, which may be communicatively coupled to the network 120, as reflected by signal line 130.

As illustrated, a robot unit 102, such as robot unit 102(a), may include one or more sensor(s) 104, an actuator controller 106, one or more actuator(s) 108, a memory 110, a robot control unit (RCU) 114, and a communication unit 116. It should be understood that the robot unit 102 may include additional and/or few components, such as an operating system, other software, input and/or output devices, etc.

The sensor(s) 104 include sensing device(s) that are capable of detecting the state of the robot unit 102, its components, and/or its environment. Non-limiting example sensing device(s) include a gyroscope, accelerometer, thermocouple, touch sensor, proximity sensor, light sensor, 2D camera, 3D camera, time of flight (TOF) camera, stereo camera, sound sensor (microphone), pressure sensor, etc. Other types of sensors are also contemplated.

The actuator controller 108 is a device for controlling the actuator(s) 108 of the robot unit 102. For example, the actuator controller 108 send signals (e.g., motion commands, calibration commands, etc.) to the actuator(s) to controls the movement or state of the robot unit 102, including the direction and speed of the robot unit 102 itself and/or its appendages and components. The actuator controller 108 may be comprised of hardware, software, and/or a combination of the foregoing. For example, the actuator controller 108 may comprise standard computer circuitry, firmware, etc., for controlling actuator(s) 198. In some implementations, the actuator controller 106 may be integrated with the processor 114 or may be distinct from but coupled to the processor 114 via the bus 181.

The actuator(s) 108 include mechanical and/or electrical devices that are capable of converting energy into motion. The actuator(s) 108 may be electric, pneumatic, hydraulic, magnetic, mechanical, and/or magnetic, and/or a combination of the foregoing. Non-limiting example actuator(s) 108 include electric motors, servomechanism, hydraulic cylinders, pneumatic actuators, corresponding gearing, connectors, and kinematic components, etc.

The memory 110 stores instructions and/or data that may be executed by the processor 114. The instructions and/or data may include code for performing the techniques described herein. The memory 110 include a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 204. Non-limiting examples include DRAM, SRAM, PROM, FPROM, ROM, a hard disk drive, an optical disk drive (CD, DVD, Blu-ray™, etc.), etc. It should be understood that the memory 110 may be a single device or may include multiple types of devices and configurations. In some embodiments, the memory 110 may store the guidance engine 112, and/or components thereof, which are accessible and executable by the processor 114.

The guidance engine 112 is computer logic executable to navigate people within an environment using a robot network. The guidance engine 112 may be implemented using any suitable configuration, such as in code and routines stored in an on-chip or off-chip storage (e.g., in the memory 110), which is accessible and executable by the processor 114; in hardware such as a field-programmable gate array (FPGA) or an application-specific integrated circuit (ASIC) comprising the processor 114; a combination of hardware and software. The guidance engine 112 and its constituent components may be stored and executable by a robot guidance server 124, a robot unit 102, a client device 132, or other computing device, and/or may distributed across more than one computing system, such as the robot guidance server 124, client device(s) 132, robot unit(s) 102, etc.

In one embodiment, the guidance engine 112 navigates a mobile automated system in view of one or more facts: (1) that humans rely on local visible information when navigating through obstacles and do not rely on estimation of obstacle information not yet visible; and (2) that not all types of crowd flows are obstacles (e.g., approaching crowd flows such as flows in an opposite direction are obstacles, but crowd flows in the same direction as the navigation direction are less likely to be obstacles). The guidance engine 112 is described below in more detail with reference to FIGS. 2-4C.

The processor 114 may execute instructions by performing various input/output, logical, and/or mathematical operations. The processor 114 may have various known computing architectures to process data signals. The processor 114 may be physical and/or virtual, and may include a single processing unit or plurality of processing units. In some implementations, the processor 114 may be capable of generating and providing electronic display signals to a display device (not shown), supporting the display of images, capturing and transmitting images, performing complex tasks including various types of feature extraction and sampling, etc. In some implementations, the processor 114 may be coupled to the memory 110 via the bus 118 to access data and instructions therefrom and store data therein. The bus 118 may couple the processor 114 to the other components of the enterprise system 110 including, for example, the memory 110, the communication unit 116, the profile data store 130, and the enterprise data store 132. It should be understood that the processor 114 may be a single device or may include multiple types of devices and configurations.

The communication unit 116 may include one or more interface devices for wired and/or wireless connectivity with the network 120, as reflected by signal line 122a, and the other components of the system 100. For instance, the communication unit 116 may include, but is not limited to, wireless transceivers for sending and receiving signals using Wi-Fi™; Bluetooth®, near-field communication (NFC), cellular communications, etc.; CAT-type interfaces; USB interfaces; various combinations thereof; etc. The communication unit 116 may be coupled to the other components of the robot unit 102 via the bus 118. The communication unit 116 may communicate using various standard communication protocols, including, for example, those discussed elsewhere herein.

The robot guidance server 124 includes computer hardware and software having data processing, storing, and communication capabilities, as discussed elsewhere herein. For example, the robot guidance server 124 may include one or more hardware servers, server arrays, storage devices and/or systems, etc. In some implementations, the components 330 and/or 340 may include one or more virtual servers, which operate in a host server environment. As depicted, the robot guidance server 124 may include an instance of the guidance engine 112 and a web server 128, which are discussed in further detail elsewhere herein.

Figure 2A:
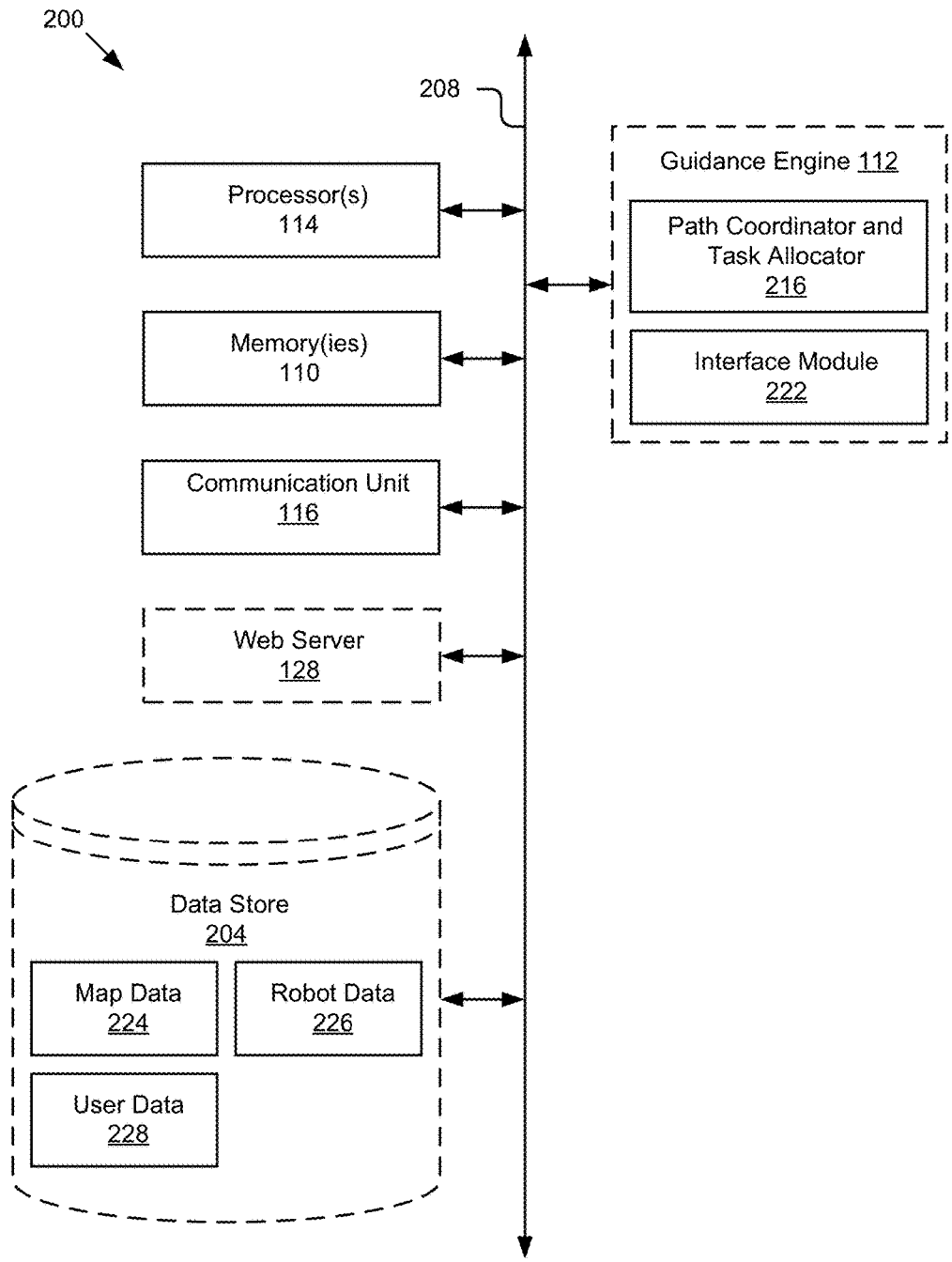
FIG. 2A is a block diagram of an example computing device.

FIG. 2A is a block diagram of an example computing device 200. The example computing device 200 may applicable to the robot unit 102, the user device 112, robot guidance server 124, or a client device 132. For example, if representing a robot guidance server 124, the computing device 200 may include an instance of the guidance engine 112 and the web server 128; and if representing a client device 132 or a robot unit 102, the computing device 200 may include an instance of the guidance engine 112, etc.

As depicted, the computing device 200 may at least include processor(s) 114, memory(ies) 120, a communication unit 116, and/or a data store 126, which may be communicatively coupled by a standard communication bus 208. The computing device 200 depicted in FIG. 2A is provided as an example and it should be understood that it may take other forms and include additional or fewer components without departing from the scope of the present disclosure, such as the components of the robot unit 102 depicted in FIG. 1 (e.g., if reflecting the architecture of a robot unit 102), standard input and output devices (e.g., pointer devices, keyboards, displays, etc.), and/or any other suitable computer components, etc. The processor(s) 114, the memory(ies) 110, and the communication unit 116 are discussed elsewhere herein and the description of these elements will not be repeated here.

The data store 204 is an information source for storing and providing access to data. The data stored by the data store 204 may be organized and queried using various criteria including any type of data stored by them, such as a robot identifier, a customer identifier, a particular location, a station, a time and/or date, a path, etc. The data store 204 may include data tables, databases, or other organized collections of data. Examples of the types of data stored by the data store 204 may include, but are not limited to, map data 224, robot data 226, user data 228, navigation data 230, etc., as discussed elsewhere herein.

The data store 204 may be included in the computing device 200 or in another computing system and/or storage system distinct from but coupled to or accessible by the computing device 200. The data store 204 includes one or more non-transitory computer-readable media for storing the data. In some implementations, the data store 204 may be incorporated with the memory(ies) 110 or may be distinct therefrom. In some implementations, the data store 204 may store data associated with a database management system (DBMS) operable on the computing device 200. For example, the DBMS could include a structured query language (SQL) DBMS, a NoSQL DMBS, a file system, flat files, various combinations thereof, etc. In some instances, the DBMS may store data in multi-dimensional tables comprised of rows and columns, and manipulate, e.g., insert, query, update and/or delete, rows of data using programmatic operations.

The user data 228 may include profiles for each of the users of the system 300, such as the patrons seeking navigational guidance by the technology described herein. The user data 228 may be correlated with the other types of data in the data store 108, for example 226. A given user's profile may include the user's user account and attributes describing the user. The user account may include information associated with the user's identity on the services provided by the system 300, such as a username, password, preference data, payment information, etc. The attributes may characterize the user's preferences and/or identity.

Map data 224 is data describing graphical, textual, geometrical, and/or other data for various service areas (e.g., geographical regions). The geographical regions may be indoor, outdoor, or a combination of both. For example, the map data 224 includes data describing a floor plan for a home and/or other building(s) where robot units may navigate. In another example, the map data 224 includes data describing sidewalks of a road, aspects of a stadium or other venue, etc. Other types of map data are possible and contemplated.

In the illustrated embodiment, the guidance engine 112 includes a path coordinator and task allocator PCTA 216, and an interface module 222, which are communicatively coupled to the bus 208 for communication with each other and/or other components of the computing device 200. The PCTA 216 includes computer logic executable by the processor(s) 114 to allocate and assign robot units 102 to patrons needing navigational guidance, and generate and provide the robot units 102 with navigational instructions to pick-up, escort, and drop-off patrons.

Figure 2B:
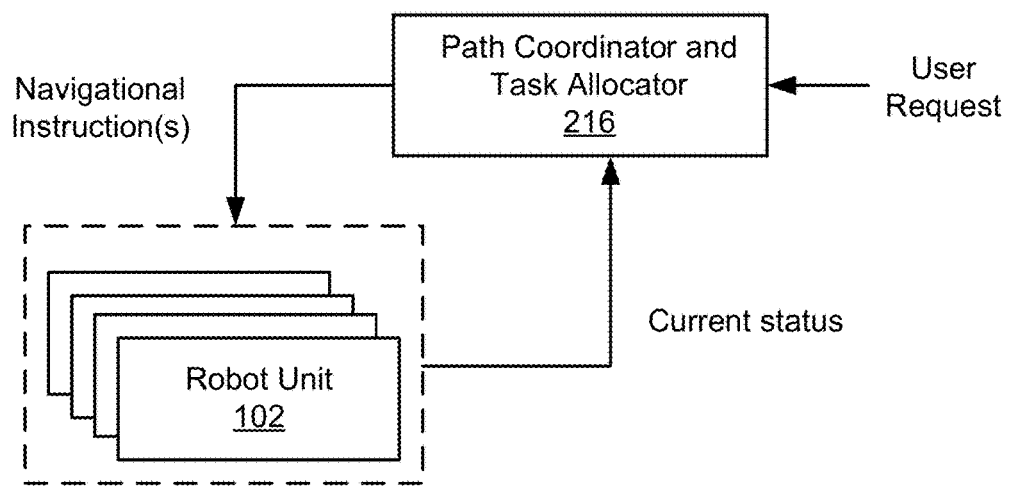
FIG. 2B is a block diagram of a process for managing a network of robot units based on changing user demand.

FIG. 2B is a block diagram of a process for managing a network of robot units 102 based on changing user demand. In some embodiments, user demand may be determined based on the number of user requests that are expected or being received, although other variations are also possible and contemplated. The number of expected user requests may be determined on historical demand, as reflected by usage logs stored in the data store 204 (e.g., as robot or user data (226 or 228), as reflected by the number of registered users located in a given area (as described by geo-location (e.g., GPS) data received by the guidance engine 112 via the network 120 from client devices 132 of the users 130, etc., as reflected by the number of user requests (e.g., HTTP requests) being received via the network 120 by the guidance engine 112, etc.

As shown, the PCTA 216 may calculate which robot unit 102 should assist a given user at a given time. For instance, the PCTA 216 may continually receive the current status of each of the robot unit(s) 102 in service, and, upon receiving a user's escort request requesting navigational assistance for a given patron located and a certain location within a service area, computes and provides navigational instruction(s) to one or more of the robot unit(s) 102, which the one or more of the robot unit(s) 102 execute in order to service the patron requesting assistance. The factors for calculating the allocation of a robot unit 102 to a user include the user(s)' location(s), the availability of each of the robot units 102, and the time required for each robot unit 102 to reach the user. In some cases, the time required to reach the user may be determined the speed of each of the robots, the path of each of the robots, and the density of the crowd. The PCTA 216 is described in further detail with reference to at least FIGS. 3-8B.

The interface module 222 is computer logic that, when executed by the processor(s) 114, renders user interfaces for display to a given user, and/or receives and processes user input received from the user. In the illustrated embodiment, the interface module 222 is communicatively coupled via the bus 208 for communication with the other components of the computing device 200. For example, the interface module 220 may retrieve data from the data store 204 and generate the user interfaces provided by it based thereon.

An example user interface generated by the interface module 220 allows the user to input various information, including, for example, a request for navigation assistance, a start point (e.g., the user's current or expected location), an intermediate destination, a final destination, etc. A further example user interface provides the user with visual and/or auditory instructions and/or information, such as information related to a robot unit's 102 estimated time of arrival; information about the progress of a current trip (e.g., estimated time of arrival, the number of transfers, points of interest along the route, travel speed, etc.); information about a pending or current transfer to another robot unit 102 (how long until the transfer, the identify of a robot unit that the patron is being transferred to, etc.); information about a reached or approaching destination (e.g., when and/or how to disembark, recommendations and/or helpful information about the destination, etc.); etc. Other user interfaces and/or variations are also contemplated and encompassed by this document.

Figure 3:
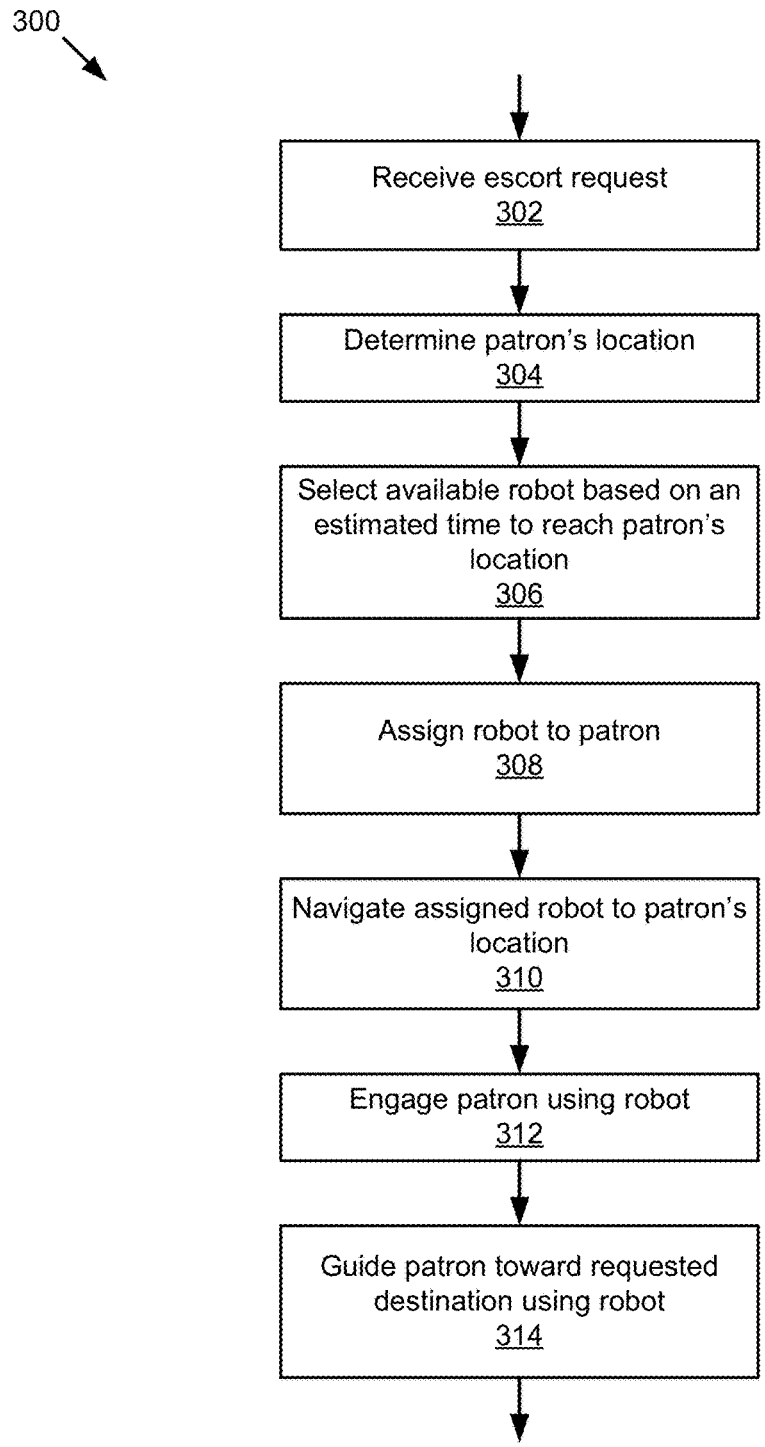
FIG. 3 is a flowchart of an example method for providing autonomous navigational assistance to patrons.

FIG. 3 is a flowchart of an example method 300 for providing autonomous navigational assistance to patrons. In block 302, the PCTA 216 receives an escort request for navigating a patron to a certain destination. The escort request may be received from a client device 132 of the patron, via an input device of a given robot unit 102, via a dedicated terminal associated with a service area (e.g., in a designated pick-up area), etc.

Responsive to receiving the escort request, in block 304, the PCTA 216 determines the patron's location. In some embodiments, the patron's location may be included with, or provided in association with, the escort request, and the PCTA 216 may parse the request for the geolocation data describing the location.

In block 306, the PCTA 216 select an available robot unit 102 based on the patron location and an estimated time to reach the patron's location. In some embodiments, the PCTA 216 may query the map data 224 for the available robot unit 102. The PCTA 216 may store and maintain collectively as map data 224, robot data 226, and user data 228, a grid map (e.g., a multidimensional (e.g., 2D) grid map) based on status data received from the robot units 102. The grid map may reflect the user(s)' location(s), the availability of each of the robot units 102, and the time required for each robot unit 102 to reach the user. In some instances, the grid map may be represented as a multidimensional vector object, a graphical object, one or more multidimensional tables, a combination of the foregoing, etc. Availability may mean that a given robot unit 102 may be idle, may be in use but accommodate additional patrons, may be available to service a particular route portion, etc.

The PCTA 216 may update the grid map as it receives status updates from various robot units 102 in operation. For example, the robot units 102 may provide iterative updates as they execute the navigational instructions (e.g., assignments) received from the PCTA 216. For instance, a robot unit 102, may, at regular intervals, transmit its geolocation to the PCTA 216 and/or other operational parameters (e.g., speed, operational health, charge level, etc.) via the network 120. Additionally and/or alternatively, the robot unit 102 may transmit updates to the PCTA 216 via the network 120 related to the assignment or the robots availability, such as, not limited to, the location of patron reached, that the engagement with patron at location successful or unsuccessful, that a transfer point was reached, that a patron was dropped off at a transfer point or requested destination, that an assignment is complete, that a certain error occurred along path and/or during execution of assignment, that the robot unit 102 is in or out of service, that the robot unit 102 is being serviced, expected time of completion of service, etc.

The PCTA 216 may process updates received and update the robot data 226 to reflect the robot unit 102's current operational state and update the map data 224 to reflect the robot unit 102's geolocation, direction, speed, etc., and the patron's geolocation and/or status.

Figure 9:
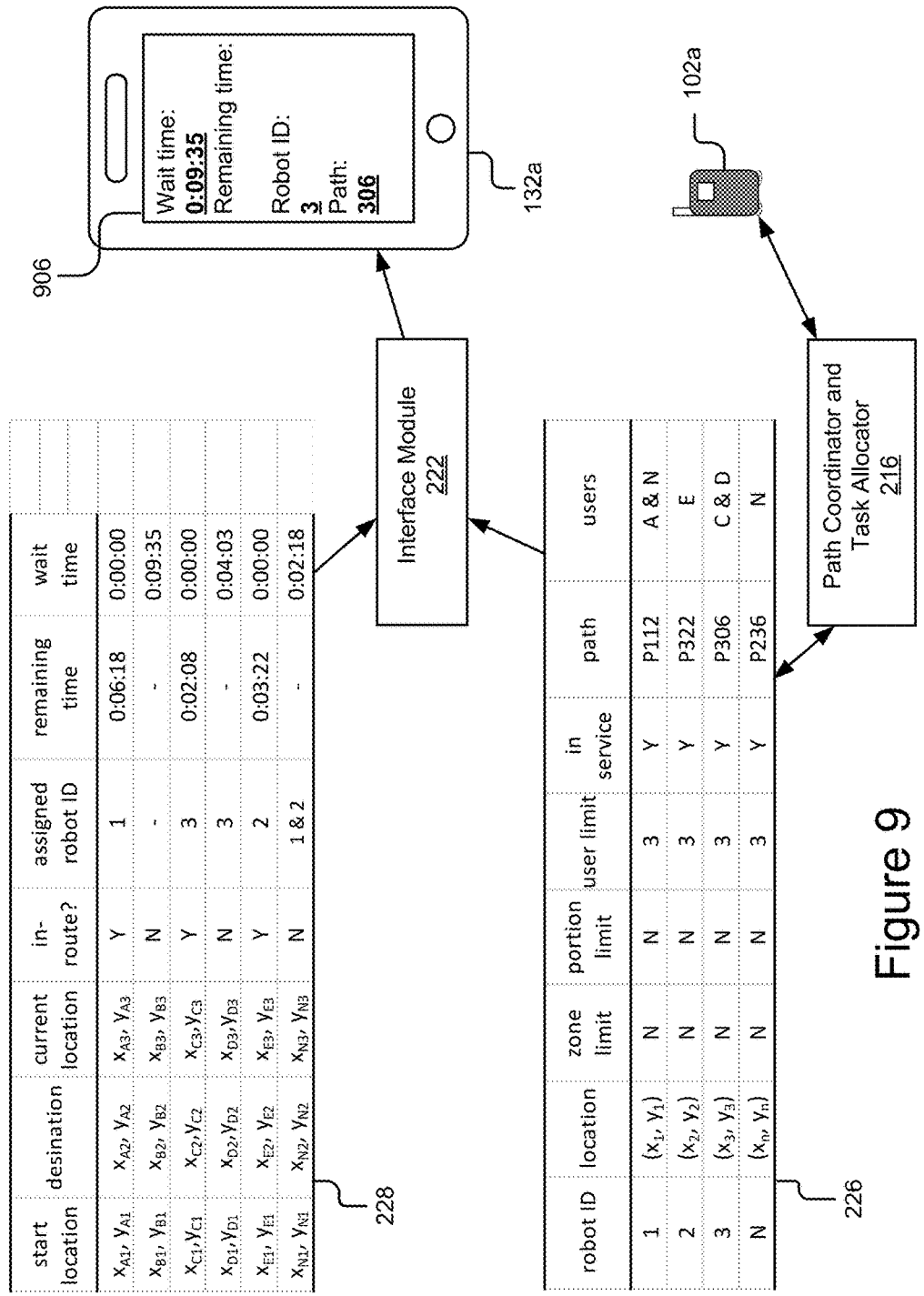
FIG. 9 reflects example data that may be stored and maintained.

FIG. 9 reflects example data that may be stored and maintained by the PCTA 216, although it should be understood that example data is non-limiting and that the data, or portions thereof (such as the map data, path data, and/or location data) may be stored in a graph-based format, vector-based format, shape-based format, textual format, various combinations of the foregoing, various standard, open, or proprietary geographic information system (GIS) formats, etc.

As depicted, the user data 228 may include, but is not limited to, user identifiers and corresponding start locations, destinations, current locations, etc., for the patrons requesting and/or receiving service. The user data 228 may further include a Boolean (e.g., flag) describing whether the patrons have been picked up (e.g., are in-route), identifiers of the robot unit(s) 102 assigned to service the patrons, estimated remaining time to the destination, and wait time to be picked-up (as applicable). Additional and/or alternative data is also applicable, such as user information (e.g., name, credentials, payment information, contact information, etc.). The robot data 226 may include, but is not limited to, robot identifiers and corresponding locations, zone limits, path portion limits, user limits, a Boolean indicating whether the robot units 102 are in-service, a path identifier reflecting the robot unit 102's current path, and the user identifiers of the users assigned to the robot units 102. In some embodiments, the interface module 222 may render user interface(s) using the stored, data, such as but not limited to, the interface 906. The PCTA 216 may dynamically update the robot-user assignments as demand for navigation increases, and correspondingly, may dynamically update the paths being followed by the robot units 102, which in-turn may be processed into actuator signals to move the robot units 102 accordingly.

Returning to FIG. 3, in block 308, the PCTA 216 assigns the selected robot unit 102 to the patron (e.g., by updating the grid map (e.g., robot data 226 and/or user data 228) with the assignment), and navigates, in block 310, the assigned robot unit 102 to the patron's location (e.g., by instructing the actuator controller 106 to move the robot unit 102 to a designated pick-up location by controlling the actuator(s) 108 accordingly). Upon reaching the patron's location, the interface module 222 engages, in block 312, the patron and then, in block 314, the PCTA 216 guides the patron toward the requested destination using the robot unit 102 (e.g., by instructing the actuator controller 106 to move the robot unit 102 along the path toward the requested destination by controlling the actuator(s) 108 accordingly).

Figure 4A:
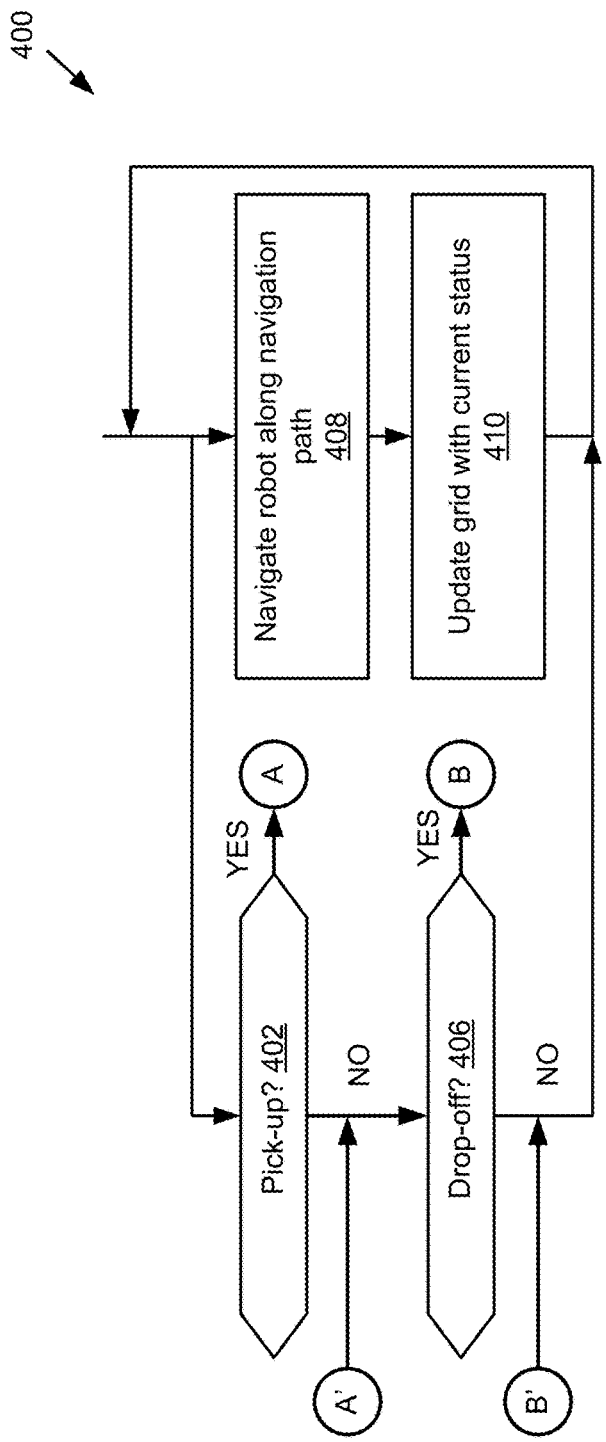
FIGS. 4A-4C are flowcharts of an example method for processing pick-up assignments and drop-off assignments.
Figure 4B:
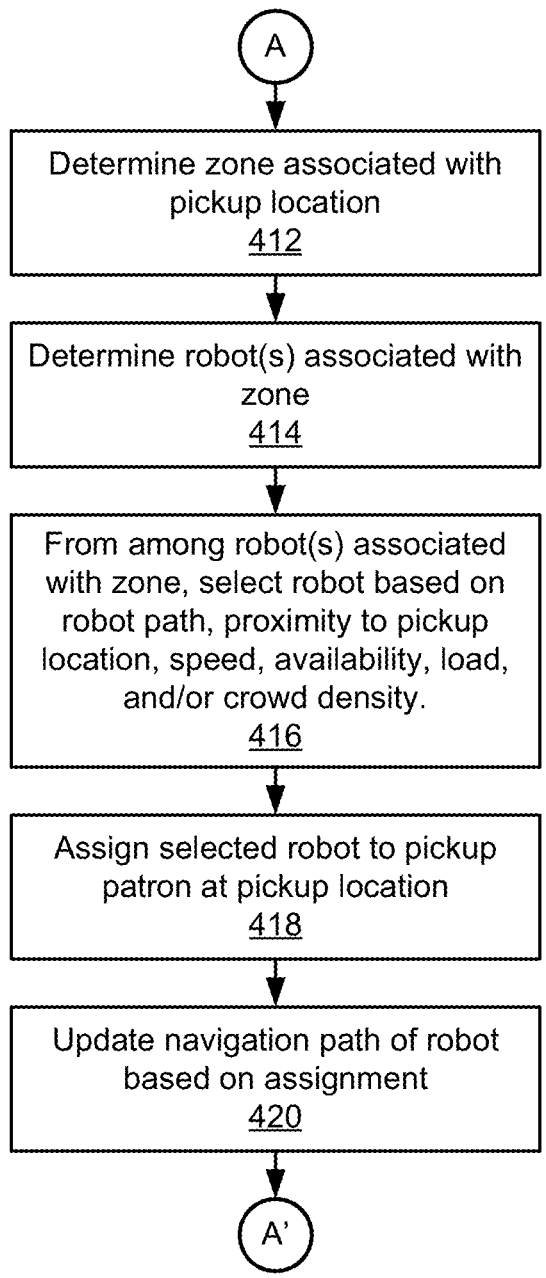
Figure 4C:
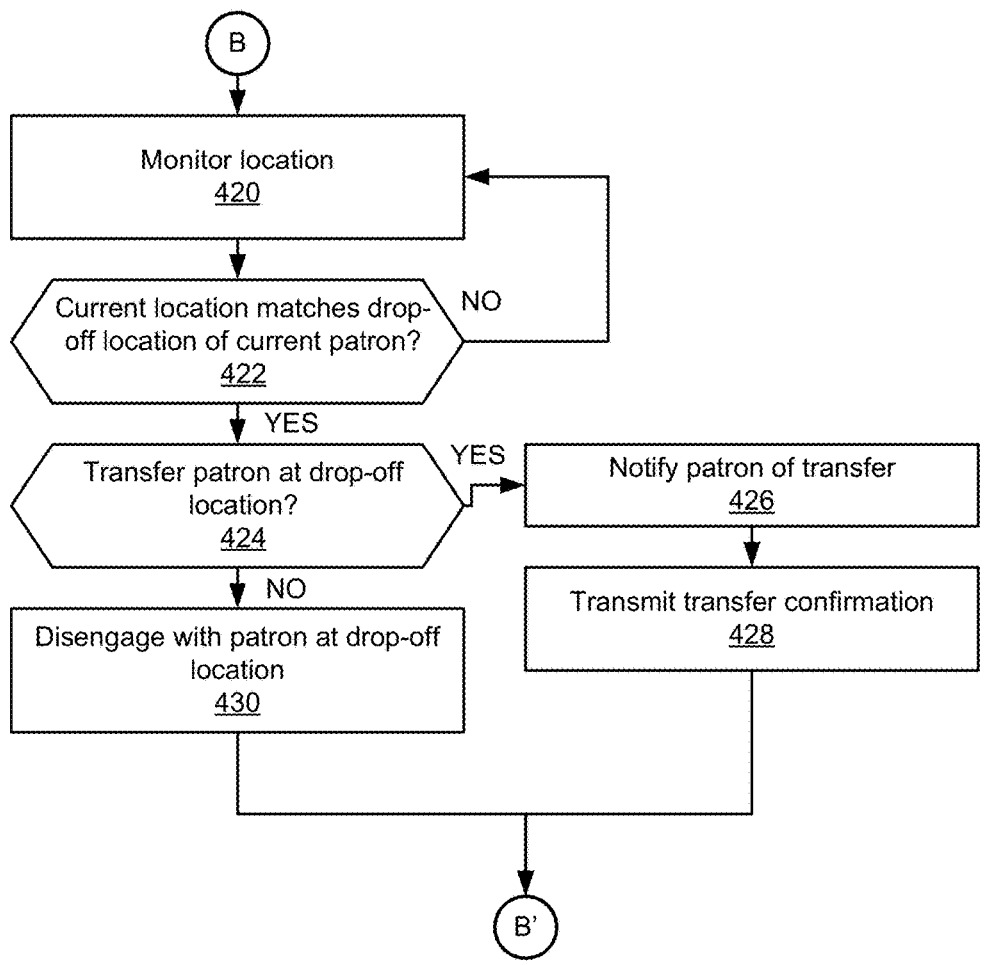

FIGS. 4A-4C are flowcharts of an example method 400 for processing the pick-up assignments and drop-off assignments. In block 408, the PCTA 216, in cooperation with the actuator controller 106 (etc.), navigates the robot unit 102 along its navigation path, and while doing so, updates the grid with its current status in block 410. In block 402, the PCTA 216 determines whether a new assignment to pick-up a patron has been received. The pick-up location may be an initial departure location or an intermediate location, such as a transfer point. If the determination in block 402 is affirmative, the PCTA 216 determines in block 412 (see FIG. 4B) which zone is associated with pick-up location. In some instances, the PCTA 216 may query the grid map (e.g., robot data 226) stored in the data store 204 that describes which zones with which the various robot units 102 are affiliated to determine the robot unit(s) 102. Certain robot unit(s) 102 may be assigned to/configured to operate within particular zones. The zones may be adjacently situated so the robot unit(s) 102 of each zone may work cooperatively to escort patrons across the zones to their intended destinations if necessary.

In block 414, the PCTA 216 determines the robot unit(s) 102 associated with the determined zone. In some embodiments, the PCTA 216 may select the available robot unit(s) 102 associated with the zone from the data store 204. Next, in block 416, the PCTA 216 selects, from among the robot unit(s) 102 associated with the zone, a robot unit 102 based on the robot path, proximity to the pick-up location, speed, availability load and/or crowd density. In some embodiments, these factor(s) may be queried using the grid map stored in the data store 204. In some cases, the time required to reach the user may be determined based on the speed of each of the robot unit(s) 102, the path of each of the robot unit(s) 102, and the density of the crowd, as reflected by the grid map.

In block 418, the PCTA 216 assigns the selected robot unit 102 to pick-up the patron at the pick-up location, and in block 420, the PCTA 216 updates the navigation path of the assigned robot unit 102 based on the assignment. In some embodiments, the PCTA 216 may assign the selected robot unit 102 by updating the assignment in the data store 224, and then generating, providing, and processing updated navigation instructions to guide the robot unit 102 along an updated path. The updated path may be stored in the data store 224 in association with the robot unit 102 and/or the patron.

Returning to FIG. 4A, from block 420, or if the determination in block 402 is negative, the method 400 moves to block 406, where the PCTA 216 determines whether a patron should be dropped off at a particular location (e.g., a transfer point, final destination, etc.). If the determination in block 406 is affirmative, the PCTA 216 monitors in block 420 (see FIG. 4C) the location of the robot unit 102 as it travels along the computed path until, in block 422, the PCTA 216 determines that the current location matches the drop-off location of the current patron. Upon determining such, the PCTA 216 determines whether the patron is being transferred at the drop-off location. If so, the interface module 222 notifies the patron of the transfer in block 426, and upon completing the drop-off, transmits confirmation of the transfer in block 428 to the grid.

In some embodiments, the robot unit 102 transmits the updated status to robot guidance server 124 for the instance of the PCTA 216 hosted by the robot guidance server 124. The PCTA 216 processes the status update by logging the trip, billing an account of the user for the service, and/or updating the navigational path of the robot unit 102 (e.g., with additional assignments).

Figure 5A:
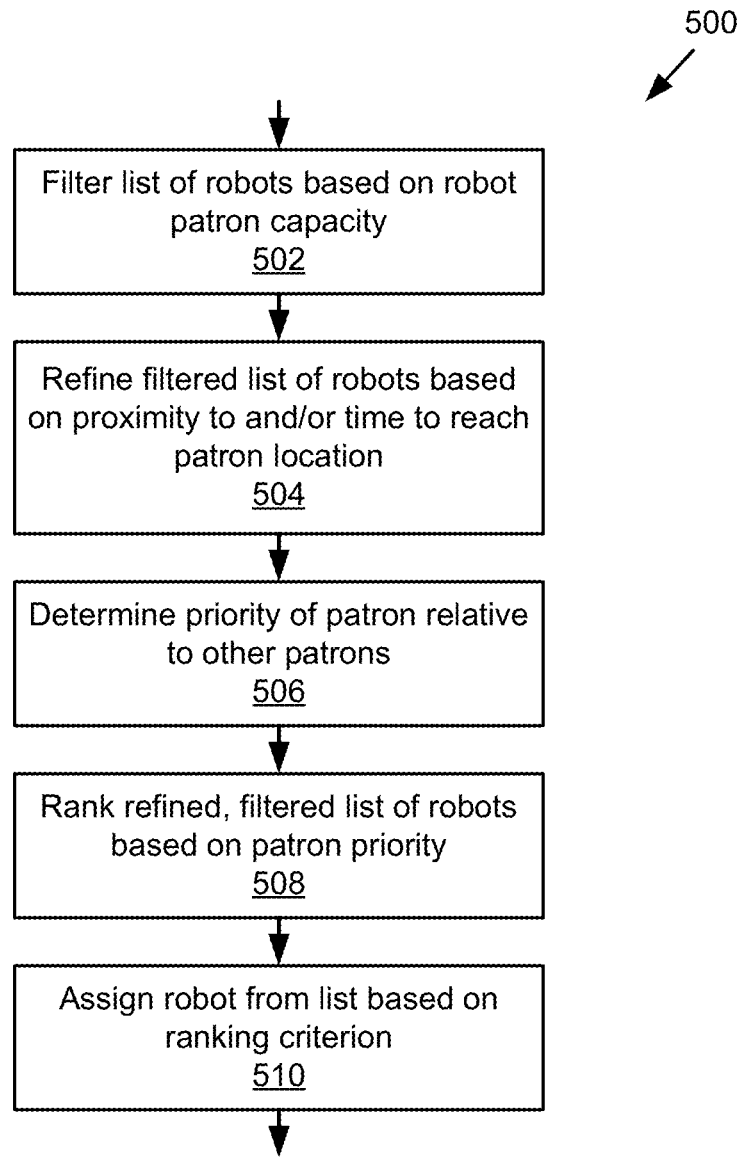
FIG. 5A is a flowchart of an example method for filtering, ranking, and assigning a robot unit.

FIG. 5A is a flowchart of an example method 500 for filtering, ranking, and assigning a robot unit 102. In block 502, the PCTA 216 filters a list of available robot units 102 based on robot capacity. The capacity and availability may be reflected by the robot data 226 stored in the data store 204, and the PCTA 216 may query this data to determine the list in some embodiments.

As the robot network is dynamic, the proximity to a given patron needing service and/or the time to reach the patron's location may continually change. As such, to reduce the wait time the patron may experience to the greatest extent possible, the PCTA 216 the PCTA 216 refines, in block 504, the list of filtered robots based on the most recent grip map data reflecting the most current calculation of the proximity of the robot to and/or time to reach the patron location.

In block 506, the PCTA 216 determines the priority of the patron relative to other patrons. For example, the user data 228 may reflect a user priority (e.g., next in line, reward tier, VIP, etc.), and the PCTA 216 may query the user data 228 to determine the user's priority. In block 508, the PCTA 216 ranks robot units 102 in the refined, filtered list based on the patron priority. In some embodiments, if the patron has the highest priority, then the robot unit 102 that is immediately available and/or has the least wait time is ranked highest. Alternatively, if the patron has the second or third priority behind two other users, the robot unit 102 having the second or third least wait time may be ranked highest. In block 510, the PCTA 216 assigns a robot unit 102 from the ranked list based on a ranking criterion. For example, the ranking criterion may be to select the highest ranking robot based on the ranking in block 508.

In the above description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Figure 5B:
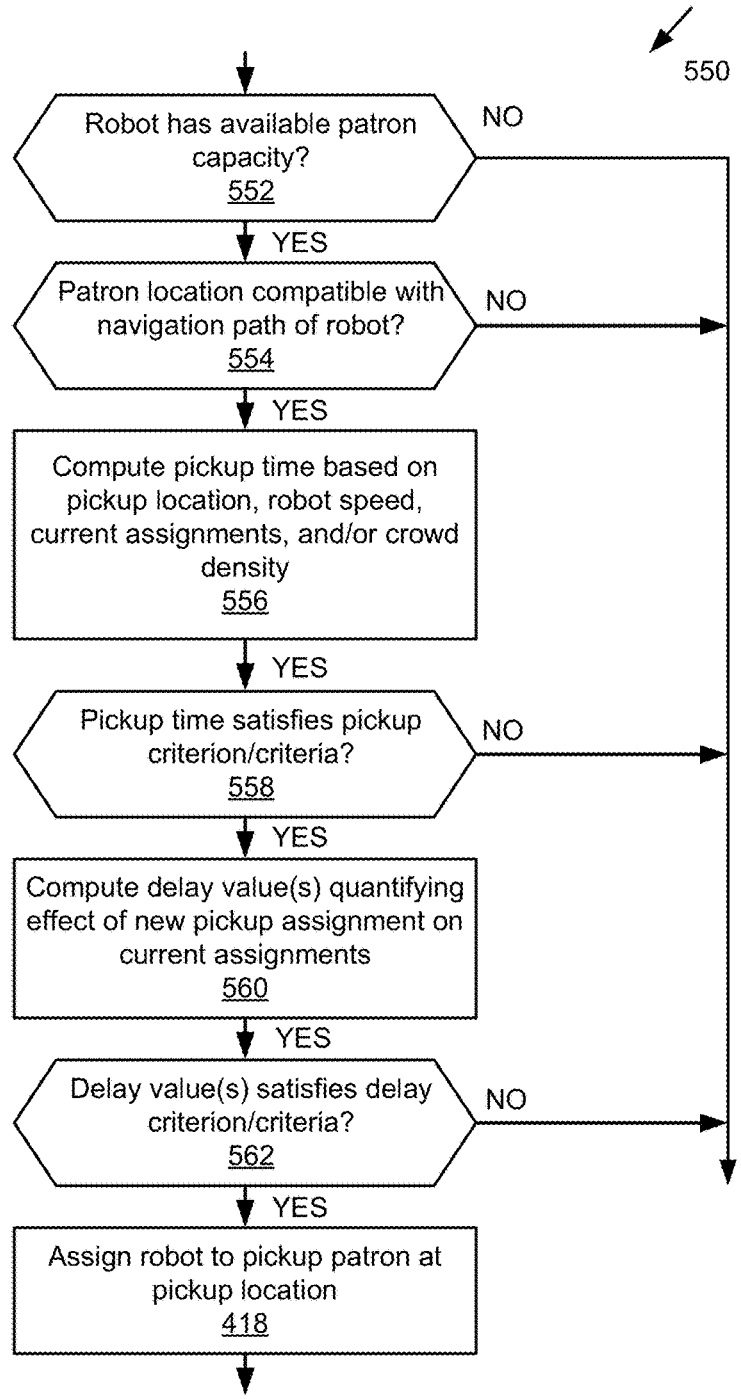
FIG. 5B is a flowchart of an example method for assigning a robot unit 102 to pick-up a patron.

FIG. 5B is a flowchart of an example method 550 for assigning a robot unit 102 to pick-up a patron. In block 552, the PCTA 216 determines whether a certain robot unit 102 has available patron capacity. If it does not, the PCTA 216 may wait or proceed to evaluate another robot unit 102. If so, the PCTA 216 determines, in block 554, whether the patron location is compatible with the navigation path of the robot unit 102. If not, the PCTA 216 may wait or proceed to evaluate another robot unit 102. If so, the PCTA 216 computes, in block 556, a pick-up time based on the patron's pick-up location, the robot unit 102's speed, the robot unit 102's current assignments, and/or the crowd density (which may be quantified and converted into a delay metric that may act as a multiplier to the expected arrival time of the robot unit 102 to the patron's location).

In block 558, the PCTA 216 determines whether the pick-up time satisfies one or more pick-up criteria. The pick-up criteria may include, but are not limited to, that the robot unit 102 arrive within a certain amount of time, whether the robot unit 102 is equipped with requisite equipment for escorting the user (e.g., meets seating, storage, peripheral requirements, etc.), etc. In block 560, the PCTA 216 computes delay value(s) quantifying the effect of a new pick-up assignment on current assignments. In some embodiments, a delay value may be quantified based on the average speed of the robot unit 102 relative to the distance the new assignment would require the robot unit 102 to travel (whether partial when sharing the assignment with one or more other robot units 102, or the entire distance if completing alone). The delay value may be further augmented based on crowd density (which may increase or decrease the delay value depending on whether the crowd density would be calculated to further impede or speed up the speed of the robot unit 102).

In block 562, the PCTA 216 determines whether the delay value(s) satisfy the delay criterion/criteria. The delay criterion/criteria may limit the amount of additional time required for the robot unit 102 to complete the assignment, although other variations are also possible and contemplated. If the determination in block 562 is affirmative, the PCTA 216 assigns the robot unit 102 to pick-up the patron at the pick-up location in block 418; otherwise the PCTA 216 waits or proceeds to evaluate another robot unit 102.

Figure 6A:
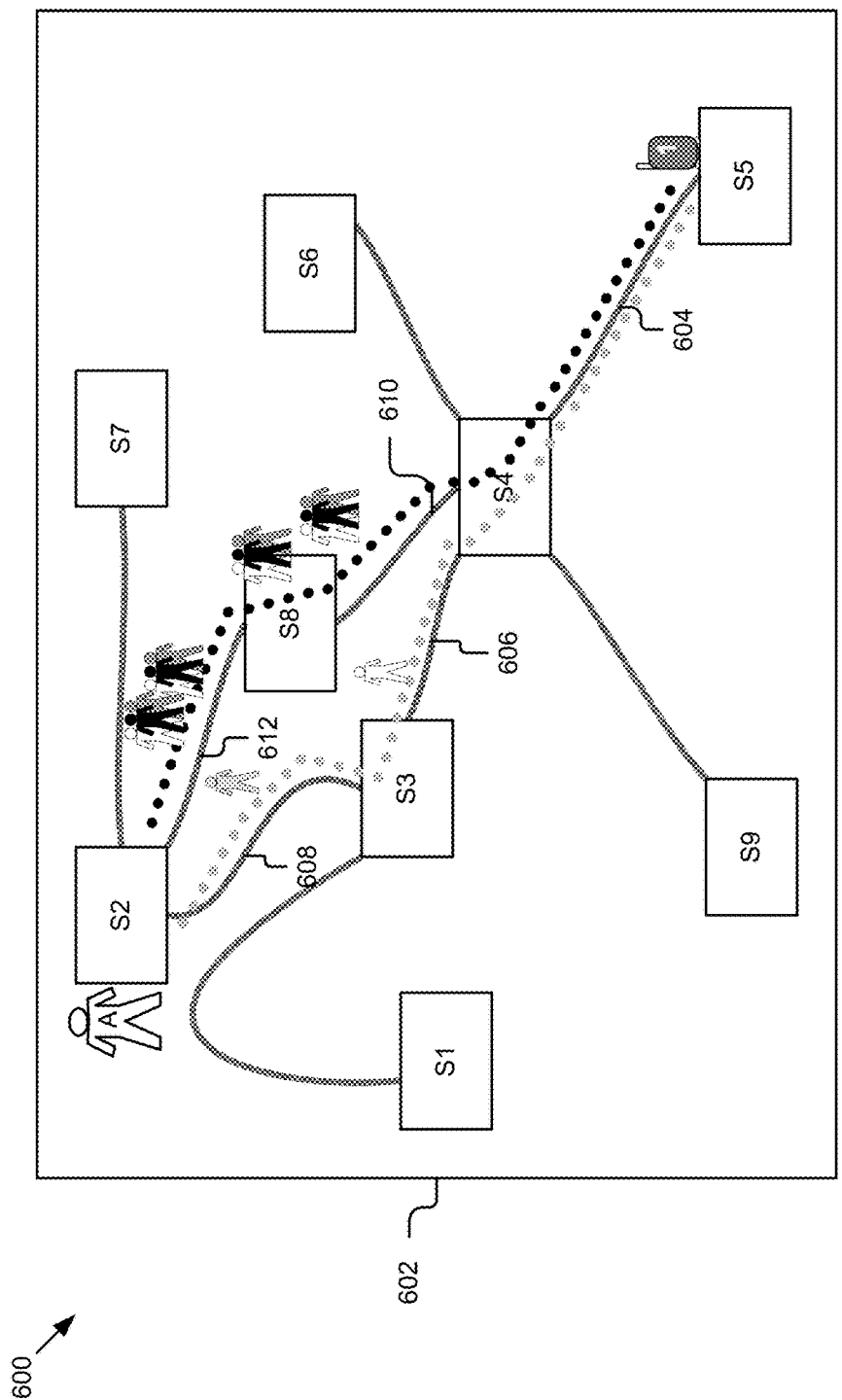
FIG. 6A is a graphical representation illustrating various example factors that may affect the generation of a navigation path for a robot unit.

FIG. 6A is a graphical representation illustrating example factors that may affect the generation of a navigation path for a robot unit 102. Upon receiving a request from the patron 130, the guidance engine 112 calculates, for each robot unit 102, different navigation paths and the time each navigation path requires to reach the patron 130. One of the factors that may affect the time a given navigation path takes is crowd density. In FIG. 6A, robot 1 at station S5 receives a request from patron A for navigation guidance from station S2. Upon receiving a request, the guidance engine 112 (executable by the robot guidance server 124 and/or robot 1) first calculates the distances of possible navigation paths, and identifies two most likely navigation paths for navigation to patron A, a first navigation path marked with grey dots and a second navigation path marked with black dots. The first navigation path includes portions S5→S4 (604), S4→S3 (606), and S3→S2 (608). The second navigation path includes portions S5→S4 (604), S4→S8 (610), and S8→S2 (612). The second navigation path is a little shorter in distance compared to the first navigation path. However, the second navigation path is more crowded as more people like to walk between S4 and S2 through S8 due to its shorter distance compared to walking between S4 and S2 through S3. After considering the crowd density for each of the two navigation paths, the guidance engine 112 finds that navigation through the first navigation path is faster, and therefore selects the first navigation path for robot 1 to service patron A at station S2. It should be understood that other factors that affect the efficacy of a navigation path are also contemplated, such but not limited to road accidents, road pavement, obstacles on the roads, intersections along the navigation paths, emergency conditions on the roads, road conditions, etc.

Figure 6B:
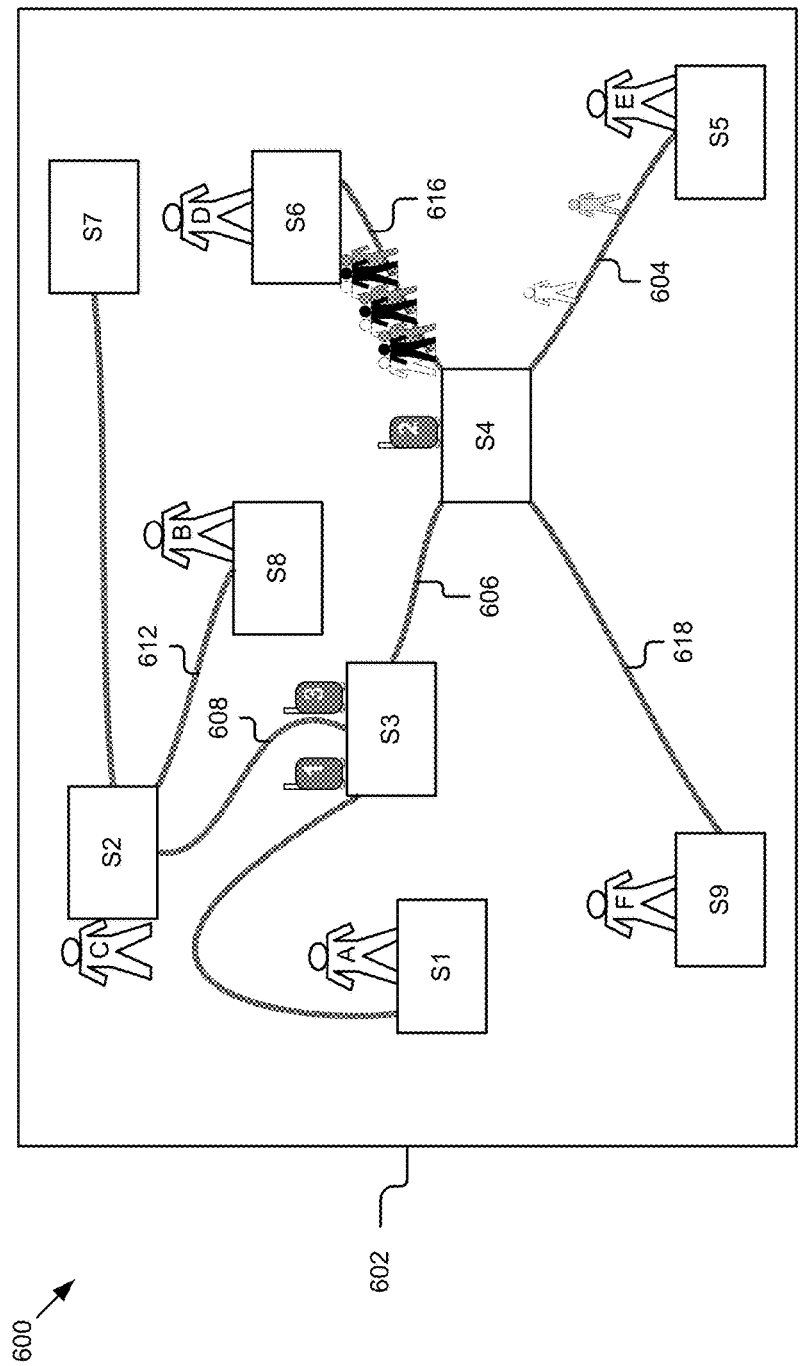
FIG. 6B is a graphical representation illustrating example assignments of different robot units.

FIG. 6B is a graphical representation illustrating example assignments of different robot units 102 to different patrons 130 at a given point in time (e.g., start of a particular day). As shown, robot units 102 (robot 1 and robot 3 at S3, and robot 2 at S4) are idle and waiting for assignment. A few patrons have requested guidance by the robot network and are waiting at different stations for navigational guidance. For instance, patron A at S1, patron B at S8, patron C at S2, patron D at S6, patron E at S5, and patron F at S9, have requested assistance.

In this example, assume each robot unit 102 moves about at relatively the same speed and the road conditions to each patron 130 are the same unless specifically discussed. For robot 1 and robot 3, patron C and patron A are the top two ranked patrons. However, compared to robot 1, robot 3 is a little closer to patron C at S2, and therefore the guidance engine 112 assigns robot 3 to patron C using the techniques described elsewhere herein. Patron C is then marked as being serviced (e.g., removed from the waiting list) in the data store 204. The guidance engine 112, when generating navigation paths for the other robots, omits Patron C from consideration. For robot 3, patron A at S1 initially ranked as the second is now moved to the top of the rank after patron C is removed from the waiting list. Therefore, robot 3 is assigned to patron A at S1. For robot 2, patron E is further away compared to patron D. However, due to a considerably higher road density in route 616 than route 604, the actual time for robot 2 to reach patron E at S6 is shorter than to reach patron D at S6. When considering patron F at S9 for robot 2, although route 630 is free of traffic, patron F is considerably further away compared to patron E. After considering distance and road density to each patron 130 in the waiting list, patron E is ranked at the top for robot 2, followed by patron D, then patron F. Based on the rank, robot 2 is then assigned to patron E at S5.

Figure 6C:
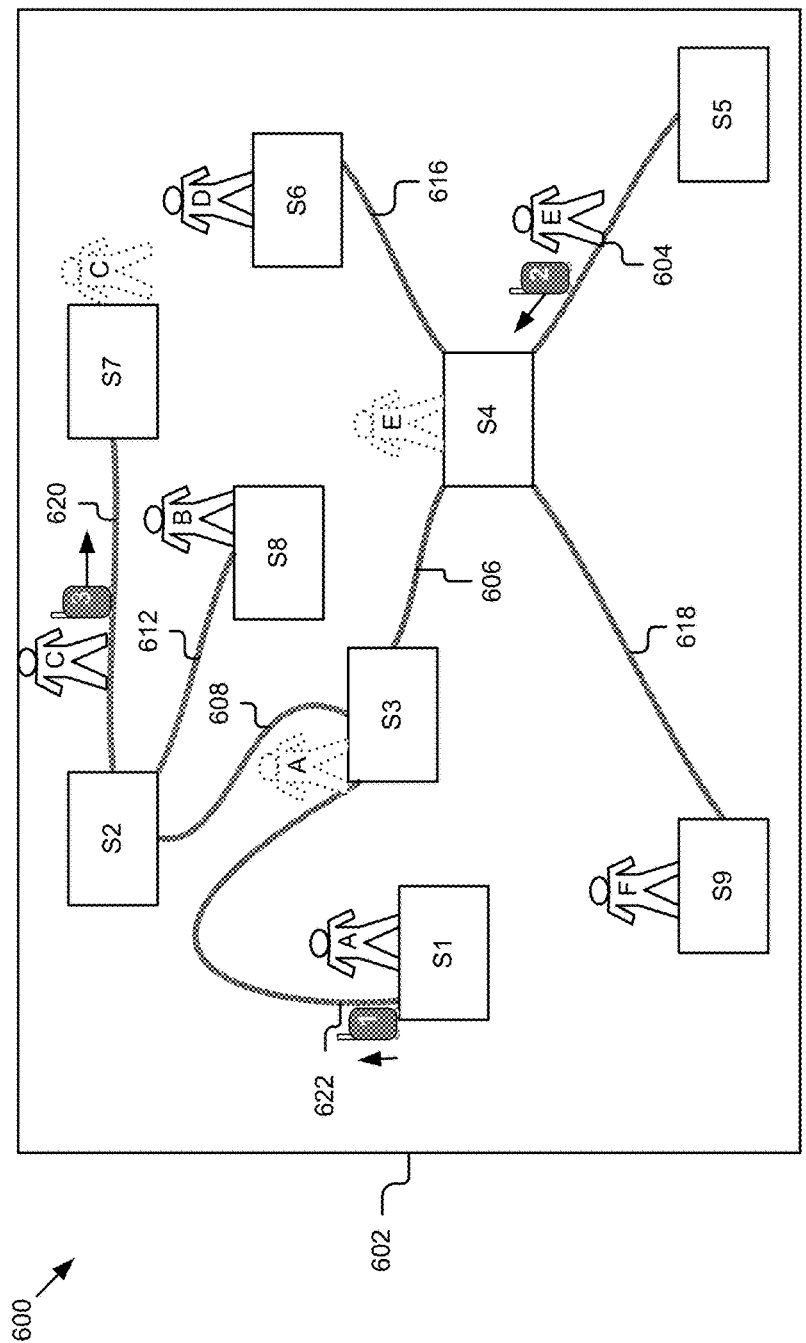
FIG. 6C is a graphical representation illustrating an example subsequent assignment of robot units to patrons at a point in time where guidance demand is high.

FIG. 6C is a graphical representation illustrating an example subsequent assignment of robot units 102 to patrons 130 at a point in time where guidance demand is high. As a result, upon completing their assignments, each robot unit 102 immediately begins servicing one or more other patrons. To navigate to the next patron, the robot unit 102 needs to first navigate to a drop-off station of the current patron 102, then navigate to a pick-up station of the next patron 103 from the drop-off station of the current patron (possibly picking up and dropping off patrons along the way depending the navigation path). In some embodiments, calculation of the distance to navigate to a next assigned patron may be different for a robot unit 102 in service when compared to a robot unit 102 when idle.

At the moment depicted in FIG. 6C, robot 3 is guiding patron C from S2 to S7 along 620, robot 2 is guiding patron E from S5 to S4 along 604, and robot 1 has just arrived to its first assigned patron A at S1 and is ready to guide patron A to S3 along route 622. The drop-off stations for patrons A, C, and E are marked by a corresponding dotted patron next to or on top of an intended drop-off station. At this moment, patrons B, D, and F are flagged as requiring service in the data store 204. After considering the current status of each of the robots relative to their assignments, the guidance engine 112 ranks patron B at the top for robot 3, while ranking patron D at the top for robot 2. The guidance engine 112 then assigns robot 2 and robot 3 to patron B and patron D respectively, and updates the navigation paths of those robots accordingly. Contemporaneously, robot 1 is assigned to patron F. However, after determining the drop-off locations for patron B and D, the guidance engine 112 re-assigns patron F to robot 2 because less time is needed for robot 2 to reach patron F while serving the first two patrons (compared to robot 1 to reach patron F after serving its first patron).

Figure 7:
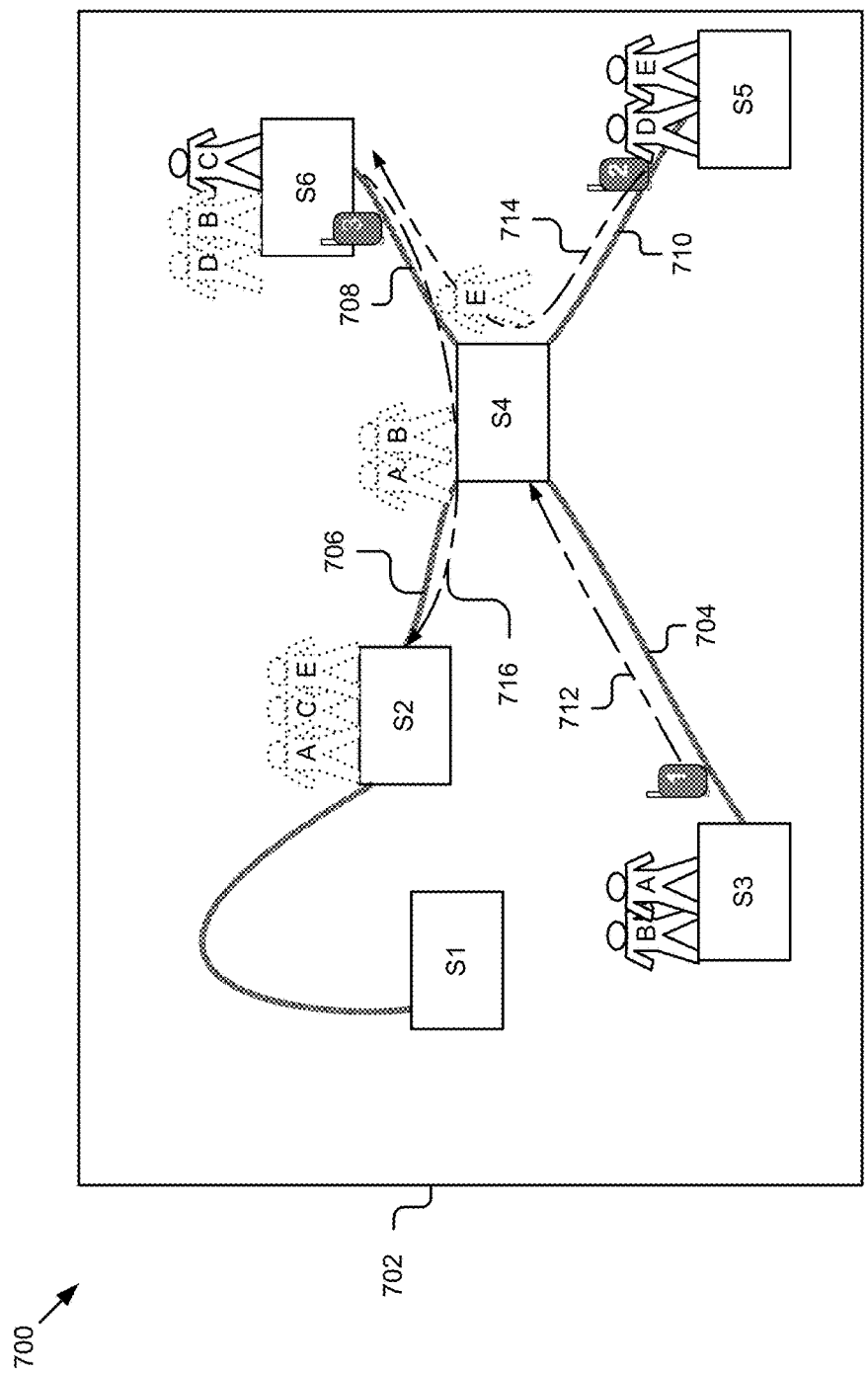
FIG. 7 is a graphical representation illustrating an example scenario where various groups of patrons are cooperatively guided by multiple robot units.

One of the advantages of the robot network is the increased efficiency achieved by servicing more than one patron along the same route and servicing a single patron using multiple robot units 102. FIG. 7 is a graphical representation illustrating an example scenario where various groups of patrons are cooperatively guided by multiple robot units. At a first point in time, patron A is located at S3, and wants to reach S2; patron B is located at S3 and wants to reach S6; patron C is located at S6 and wants to reach S2; patron D is located at S5 and wants to reach S6; and patron E is located at S5 and wants to reach S2. Robot 1 is located at S3, robot 2 is located at S5, and robot 3 is located at S6.

The guidance engine 112 evaluates the destinations of patrons A and B (relative to the navigation paths of the other robots (714 and 716)), and determines that patrons A and B may be guided together by robot 1 along 704 to S4, and then transferred to different robots (2 and 3) and an intermediate point (S4). The guidance engine 112 assigns robot 3 to guide patron C to S2 via routes 708 and 706. The guidance engine 112 evaluates the destinations of patrons D and E (relative to the navigation paths 712 and 714 of the other robots), and determines that patrons D and E may be guided together by robot 2 to S4 along 714, where patron E will be transferred to a different robot (robot 3) and patron D will continue on with robot 2 to S6.

In this scenario, patron C arrives at S4 earlier than robot 1. Robot 3 navigates to S4 along 708 and drops off patron C at S4, and upon arrival of robots 1 and 2, picks-up patrons A and E and continues along 706 to S2 to drop-off patrons A, C, and E. Robot 2 navigates along 710 and arrives at S4 earlier than robot 1, drops-off patron E at S4, and picks up patron B once robot 1 arrives. Robot 2 then continues on along 708 to S6 to drop-off patrons B and D at S6. Robot 1 navigates along 712 and drops off patrons B and A at S4. As with FIGS. 6A-6C and 8, the dotted patron outlines in FIG. 7 indicate those patrons' drop-off locations, and the solid patron outlines in FIG. 7 indicate those patrons' pick-up locations. This example in particular illustrates the time efficiency advantage provided the robot network relative to other solutions that lack the ability to accommodate more than one patron, transfer patrons, and account for other factors such as crowd density, robot capability, navigation surface conditions, service area layout, etc.

Figure 8A:
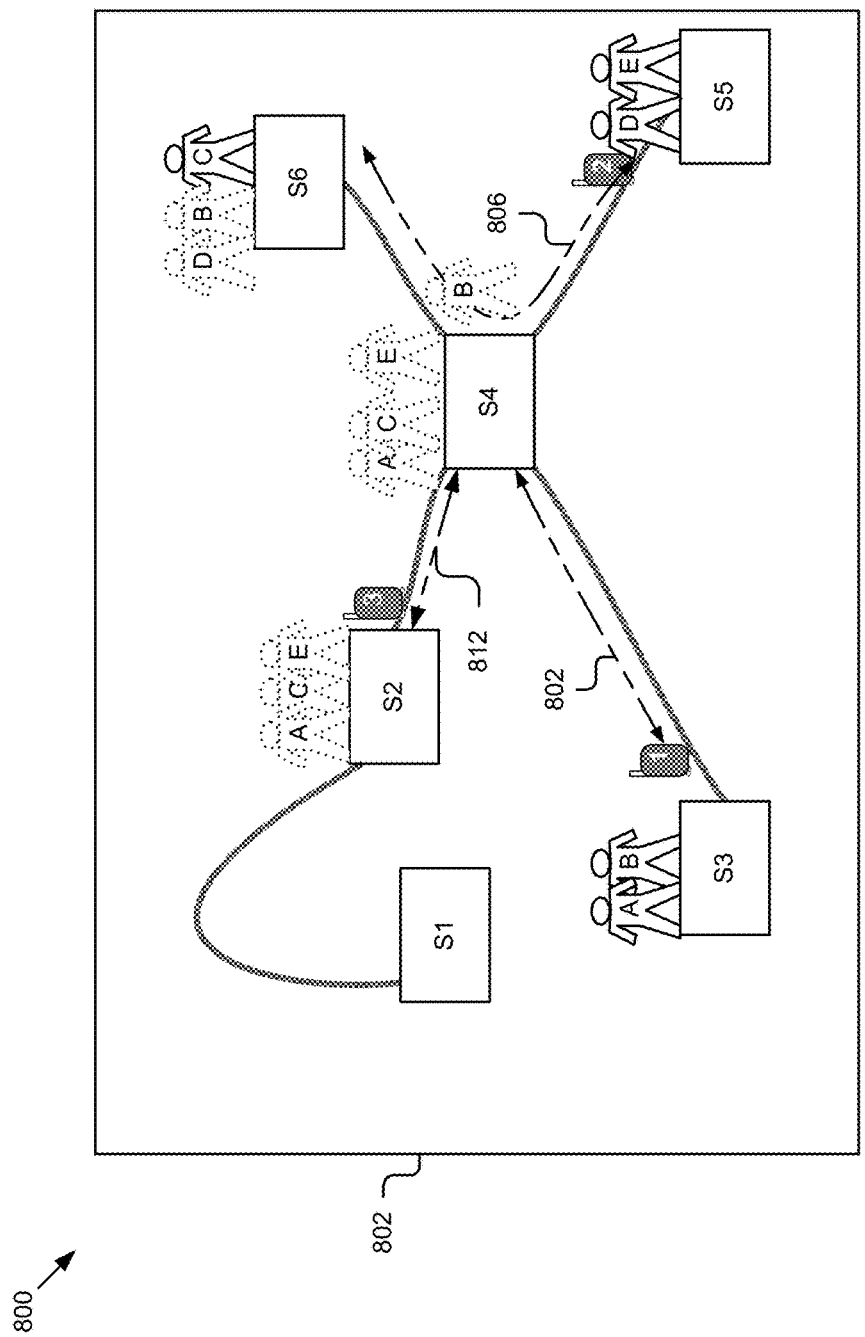
FIG. 8A is a graphical representation illustrating an example scenario where multiple robot units are assigned to certain routes

In some embodiments, robot units 102 are assigned to certain fixed routes or route portions and/or zones to provide additional efficiency benefits, particularly when certain routes are much more utilized (e.g., 3×'s, 10×'s, etc., more popular) than other routes, or certain zones and or service areas experience unusually high demand. FIG. 8A is a graphical representation illustrating an example scenario where multiple robot units 102 are assigned to certain routes. In particular, robot 1 is assigned to navigation path 802 and navigates back and forth between S3 and S4 along route 804. Similarly, robot 2 is assigned to navigation path 806 and navigates back and forth between S5 and S6, and Robot 3 is assigned to navigation path 812 and navigates back and forth between S4 and S2.

Accordingly, as depicted, robot 1 guides patrons A and B from S3 to S4, where it drops patrons A and B off for pickup by robot 3. Robot 2 guides both patrons D and E from S5 to S4, drops off patron E at S4, waits for the arrival of patron B at S4, picks-up patron B at S4, and then guide both patrons B and D to S6. After arriving at S6, robot 2 picks-up patron C, navigates back to S4, and drops-off patron C at S4. Robot 3 picks-up patrons A and E at S4 after their arrivals to S4, navigates them to S2, drops them off, and then returns to S4 to pick-up patron C after robot 2 drops patron C off. Robot 3 then returns to S2 to drop patron C off In some embodiments, the maximal waiting time for a robot unit 102 at a given transfer point can be pre-set at the beginning and optimized during run-time. This may result in robots making more short runs with fewer patrons, or may result in robots making more long runs with more patrons, depending on the relative efficiency between these approaches.

Figure 8B:
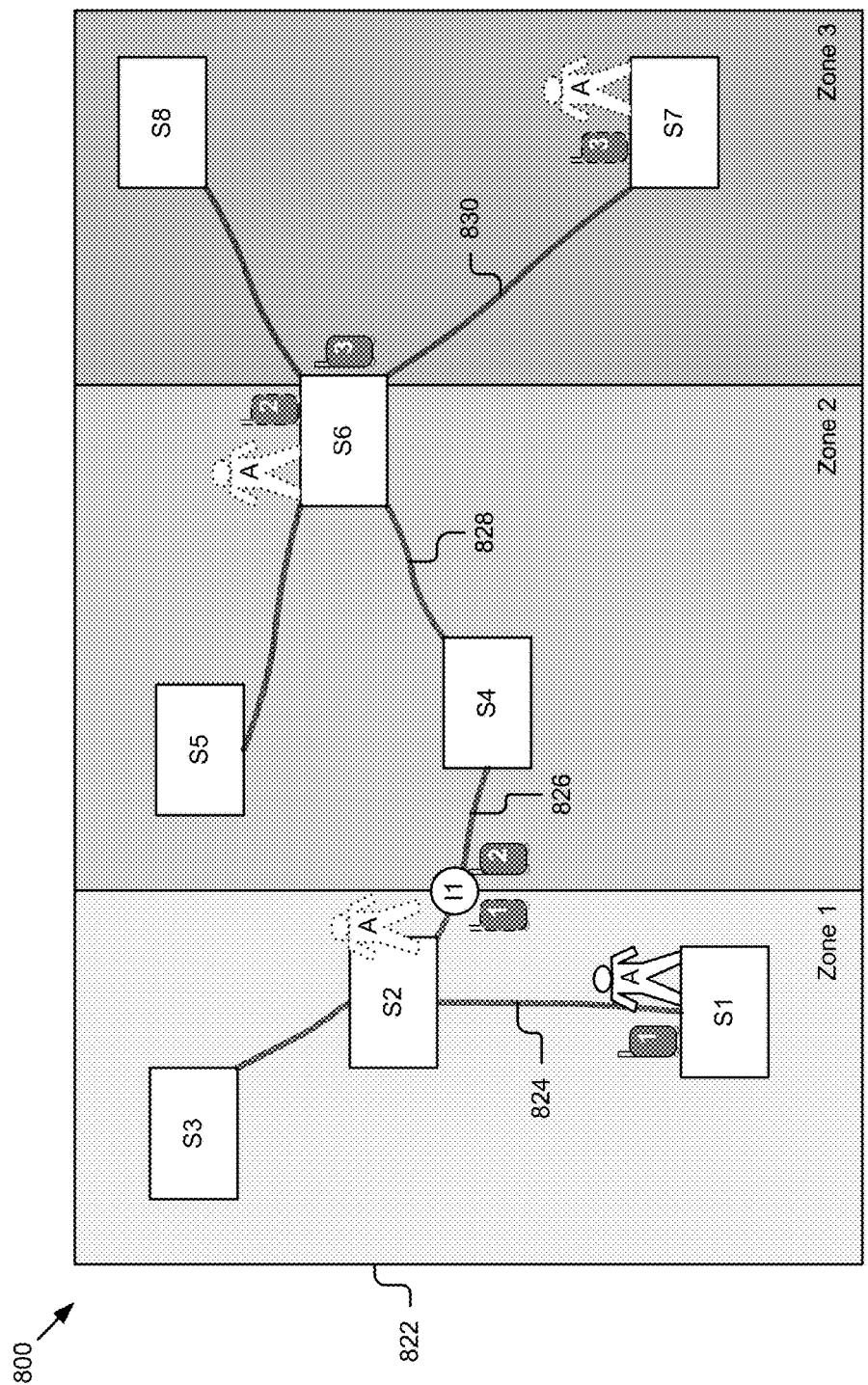
FIG. 8B is a graphical representation illustrating another example scenario where multiple robot units are assigned to certain zones in a serving area.

FIG. 8B is a graphical representation illustrating another example scenario where multiple robot units 102 are assigned to certain zones in a serving area, such as a shopping mall, or a stadium. In FIG. 8B, a service area 822 is divided into three different zones, that is, zone 1, zone 2, and zone 3. Robot 1, robot 2, and robot 3 are assigned to zones 1, 2, and 3 respectively, and each navigates within the boundaries of the assigned zone. Patron A wants to get to S7 from S1. The navigation path for navigating patron A is calculated by the guidance engine 112 through route portions 824, 826, 828, and 830. According to the navigation path, robot 1 picks-up patron A at S1, and guides the patron A from S1 to S2 and on to intersection I1, a boundary site between zone 1 and zone 2, where robot 1 drops-off patron A at intersection I1 for pick-up by robot 2. After pick-up of patron A, robot 2 guides patron A to S4 along route 826, then to S6 along route 828. S6 is located at a boundary site between zone 2 and zone 3. Upon arrival to S6, robot 2 drops-off patron A for pick-up by robot 3. After pick-up of patron A, robot 3 guide patron A to S7, the final destination for patron A. In this example, (while not depicted) patron A is not guided along the shortest path because robots 1, 2, and 3 are servicing other patrons along the way within the zone. In further examples, depending on demand and capacity constraints, patron A may be guided along a straight and/or shorter path between S1 and S7.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware embodiment, an entirely software embodiment, or embodiments containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method for managing a robot network, the method comprising:
    receiving, using one or more computer processors, an escort request to escort a first patron to a requested destination;
    determining, using the one or more computer processors, a first patron's location;
    selecting, using the one or more computer processors, an available robot unit from among a plurality of robot units comprising a robot network based on an estimated time to reach the first patron's location, the estimated time to reach the first patron's location being determined based on status updates of other of the robot units comprising the robot network;
    assigning, using the one or more computer processors, the available robot unit to the first patron;
    navigating, using the one or more computer processors, the assigned robot unit to the first patron's location;
    engaging, using the one or more computer processors, the first patron using the assigned robot unit; and
    guiding, using the one or more computer processors, the first patron toward the requested destination using the assigned robot unit.

2. The method of claim 1, wherein the robot units comprising the robot network are configured to cooperatively provide navigation guidance within a service area, the plurality of robot units including the assigned robot unit.

3. The method of claim 2, wherein the service area is divided into two or more zones, each of the two or more zones representing a portion of the service area, and the available robot unit is assigned to one of the two or more zones.

4. The method of claim 1, further comprising:
    iteratively receiving at a server, via a computer network, status updates from the robot units;
    generating, using the one or more computer processors, one or more navigational paths for one or more of the robot units based on the status updates; and
    controlling, using the one or more computer processors, movement of the one or more robot units based on the one or more navigational paths.

5. The method of claim 1, wherein the plurality of robot units are wirelessly coupled via a computer network.

6. The method of claim 1, further comprising:
    updating, using the one or more computer processors, a grid map with a current status of the assigned robot unit once the assigned robot unit has guided the first patron to the requested destination; and
    assigning, using the one or more computer processors, the assigned robot unit to guide a subsequent patron to a subsequent requested destination based on the grid map, which includes current statuses of other robot units in the robot network.

7. The method of claim 1, further comprising:
    transferring, using the one or more computer processors, the first patron, at a particular location between a start location and the requested destination, to a second robot unit; and
    guiding, using the one or more computer processors, the first patron to the requested destination using the second robot unit.

8. The method of claim 7, further comprising:
    prior to transferring the first patron, assigning, using the one or more computer processors, a second robot unit to navigate a second patron to a second destination, the second destination being the same as the requested destination; and
    guiding, using the one or more computer processors, the second robot unit to the particular location to pick-up the first patron, wherein guiding the first patron to the requested destination using the second robot unit includes guiding the first patron and the second patron to the requested destination together.

9. The method of claim 1, further comprising:
    determining, using the one or more computer processors, a list of robot units comprising at least a portion of the robot network;
    filtering, using the one or more computer processors, the list of robot units based on patron capacity of each of the robot units;
    refining, using the one or more computer processors, the filtered list of robots units based on the estimated time for each of the robot units to reach the first patron's location, the refined list including the available robot unit; and assigning, using the one or more computer processors, the available robot from the refined list of robot units.

10. The method of claim 9, further comprising:
determining, using the one or more computer processors, a priority of the first patron relative to other patrons requesting guidance; and
ranking, using the one or more computer processors, the refined list of robot units based on the priority of the patron, the ranking including the available robot unit.

11. A system comprising:
one or more computer processors; and
one or more memories storing instructions that, when executed by the one or more processors, cause the system to perform operations including:
receiving an escort request to escort a first patron to a requested destination, determining a first patron's location,
selecting an available robot unit from among a plurality of robot units comprising a robot network based on an estimated time to reach the first patron's location, the estimated time to reach the first patron's location being determined based on status updates of other of the robot units comprising the robot network,
assigning the available robot unit to the first patron,
navigating the assigned robot unit to the first patron's location,
engaging the first patron using the assigned robot unit, and
guiding the first patron toward the requested destination using the assigned robot unit.

12. The system of claim 11, wherein the robot units comprising the robot network are configured to cooperatively provide navigation guidance within a service area, the plurality of robot units including the assigned robot unit.

13. The system of claim 12, wherein the service area is divided into two or more zones, each of the two or more zones representing a portion of the service area, and the available robot unit is assigned to one of the two or more zones.

14. The system of claim 11, wherein the instructions, when executed by the one or more computer processors, further cause the system to perform operations including:
iteratively receiving at a server via, a computer network, status updates from the robot units, generating one or more navigational paths for one or more of the robot units based on the status updates, and controlling movement of the one or more robot units based on the one or more navigational paths.

15. The system of claim 11, wherein the plurality of robot units are wirelessly coupled via a computer network.

16. The system of claim 11, wherein the instructions, when executed by the one or more computer processors, further cause the system to perform operations including:
updating a grid map with a current status of the assigned robot unit once the assigned robot unit has guided the first patron to the requested destination, and
assigning the assigned robot unit to guide a subsequent patron to a subsequent requested destination based on the grid map, which includes current statuses of other robot units in the robot network.

17. The system of claim 11, wherein the instructions, when executed by the one or more computer processors, further cause the system to perform operations including:
transferring the first patron, at a particular location between a start location and the requested destination, to a second robot unit, and
guiding the first patron to the requested destination using the second robot unit.

18. The system of claim 17, wherein the instructions, when executed by the one or more computer processors, further cause the system to perform operations including:
prior to transferring the first patron, assigning a second robot unit to navigate a second patron to a second destination, the second destination being the same as the requested destination, and
guiding the second robot unit to the particular location to pick-up the first patron, wherein guiding the first patron to the requested destination using the second robot unit includes guiding the first patron and the second patron to the requested destination together.

19. The system of claim 11, wherein the instructions, when executed by the one or more computer processors, further cause the system to perform operations including:
determining a list of robot units comprising at least a portion of the robot network,
filtering the list of robot units based on patron capacity of each of the robot units,
refining the filtered list of robots units based on the estimated time for each of the robot units to reach the first patron's location, the refined list including the available robot unit, and
assigning the available robot from the refined list of robot units.

20. The system of claim 19, wherein the instructions, when executed by the one or more computer processors, further cause the system to perform operations including:
determining a priority of the first patron relative to other patrons requesting guidance; and
ranking the refined list of robot units based on the priority of the patron, the ranking including the available robot unit.

* * * * *